Oct. 21, 1969 A. V. BARON 3,473,384
TILTABLE PYROMETER MOUNTING FOR ROTARY KILNS OR THE LIKE
Filed Jan. 12, 1968 2 Sheets-Sheet 1

Inventor
Anthony V. Baron
By Robert C. Sullivan
Attorneys

United States Patent Office 3,473,384
Patented Oct. 21, 1969

3,473,384
TILTABLE PYROMETER MOUNTING FOR ROTARY KILNS OR THE LIKE
Anthony V. Baron, South Milwaukee, Wis., assignor to Allis-Chalmers Manufacturing Company, Milwaukee, Wis.
Filed Jan. 12, 1968, Ser. No. 697,451
Int. Cl. G01k *1/08, 11/00*
U.S. Cl. 73—351                                       10 Claims

ABSTRACT OF THE DISCLOSURE

A radiation pyrometer for a rotary kiln is mounted at the radially outer end of a sight tube which is supported for angular adjustment by a bearing carried by a housing mounted in a passage extending through the kiln wall, whereby the pyrometer and sight tube may be angularly adjusted in a plane extending substantially transverse of the longitudinal axis of the kiln.

BACKGROUND OF THE INVENTION

Field of the invention

This invention relates to temperature measurement in rotary kilns, and more particularly to a tiltable or angularly adjustable mounting for a pyrometer used in kiln temperature measurement.

Description of the prior art

It is well known in the prior art, as exemplified, for example, by U.S. Patent 3,345,873, issued to Otto G. Lellep, on Oct. 10, 1967, entitled "Rotary Kiln Temperature Measurement" to utilize a radiation pyrometer which is mounted on the outside of a kiln shell, in alignment with a sight hole which extends through the kiln shell, whereby radiation from the heated material inside the kiln passes through the sight hole to the radiation pyrometer to provide an indication of the temperature of the material being heated.

One problem which is encountered with the prior art mounting arrangements for pyrometers on kilns, as for example, the mounting arrangement shown in the aforementioned Lellep patent, is the fact that the sight tube for the pyrometer and the pyrometer itself are mounted in a fixed position at all times, which fixed position may not be the most desirable position or angle of sight for a given kiln or for a given load condition of the kiln. For example, in a large kiln with a heavy bed of material therein, the fixed sight hole and pyrometer mounting of the prior art may be directed at an angle such that the material being heated gets into the sight tube, coats the pyrometer lens and obstructs the line of sight. Furthermore, the particles of material getting into the sight tube as just described may clog the air blower which blows air through the sight tube as shown in the aforementioned Lellep patent. On the other hand, in a small kiln with a light feed bed, the fixed position of the sight tube and pyrometer mounting of the prior art may cause the air which is being blown through the sight tube by the air blower as shown by the Lellep patent to blow holes in the bed of material, with the result that at a time when the pyrometer should be sensing the temperature of the material being heated it is instead sensing the temperature of the inside wall of the kiln.

The need for adjustment of the angle of the sight tube is also a function of the particle size of the material being heated in the kiln, since with large particles there is more tendency for particles to drop into the sight tube than there is in the case of small particles.

Still a further problem and one which occurs more frequently with light kiln loads than with heavy kiln loads is that caused by the plasticity of the feed material, since when the material becomes plastic it has a tendency to close off the opening to the sight tube. The solution to this problem which is provided by the present invention is the selection of the proper adjusted angle of the air tube and pyrometer such that the available fixed air pressure is of sufficient magnitude to prevent build-up of plastic feed at the sight tube opening. Such a solution is not possible in the prior art disclosures in which the sight tube and pyrometer are always in a constantly fixed position on the kiln.

With a fixed angle sight tube of the type shown by Lellep, it is necessary to provide an associated blower for the sight tube of maximum anticipated capacity, and to reduce the output pressure of the blower by pressure control means for conditions requiring less than maximum output from the blower. In contrast, in a kiln equipped with the angularly adjustable sight tube of the invention, it is possible to use a blower of much smaller capacity and to obtain the necessary relation of sight tube to kiln size and load by adjustment of the angle of the sight tube. The use of an angularly adjustable sight tube permits the same size small capacity blower to be used on a large range of kiln sizes by merely readjusting the angle of the sight tube to conform to the requirements of the respective kilns. This permits a single spare sight tube blower of relatively small size to be stocked as a replacement for a plurality of kilns of various sizes. In accordance with the prior art, if it were desired to use a single spare sight tube blower as a possible replacement for a plurality of kilns of various sizes, it was necessary to stock a spare conforming to the largest kiln on which a replacement blower might be required. The smaller capacity sight tube blowers permitted by the use of the angularly adjustable sight tube provides a safety factor, since it permits the use of lower voltage motors for the sight tube blowers such as 110-volt single phase motors, as compared to 440-volt, 3-phase motors required for sight tube blowers associated with fixed angle sight tubes.

Accordingly, it is an object of the present invention to provide a tiltable or angularly adjustable mounting for a pyrometer and the sight tube thereof with respect to the kiln on which these members are mounted.

It is another object of the invention to provide an angularly adjustable or tiltable pyrometer mounting and sight tube on a rotary kiln which permits adjustment of the optimum angle of the pyrometer and sight tube for a given kiln, taking into consideration such factors as optimum bed depth and type of feed employed.

Another object of the invention is to provide an angularly adjustable or tiltable pyrometer mounting for a rotary kiln which minimizes the problem of the heated material getting into the pyrometer sight tube, thereby minimizing the problem of the pyrometer lens becoming coated with the material being heated, and also minimizing the problem of the line of sight through the sight tube becoming obstructed.

It is another object of the invention to provide a tiltable or angularly adjustable pyrometer mounting for rotary kilns which permits adjustment of the angle of the sight tube to minimize the problem of the air from the air blower associated with the pyrometer blowing holes in the material bed.

Still a further object of the invention is to provide a tiltable or angularly adjustable pyrometer mounting for rotary kilns in which the angle of the sight tube may be adjusted to provide optimum adjustment for a given particle size, such as for large and small particles, and which may also be adjusted to an optimum angle for plasticity of the feed material in the kiln.

Still a further object of the invention is to provide a tiltable or angularly adjustable pyrometer mounting for rotary kilns which permits the use of a relatively small capacity sight tube blower on a variety of kiln sizes.

In achievement of these objectives, there is provided in accordance with this invention a rotary kiln including a radiation pyrometer which is mounted at the radially outer end of a sight tube which is supported for angular adjustment by a bearing carried by a housing mounted in a passage extending through the kiln wall. The pyrometer and sight tube may be angularly adjusted in a plane extending substantially transverse of the longitudinal axis of the kiln to obtain the optimum adjusted angular position relative to the kiln for a given kiln and load condition.

Further objects and advantages of the invention will become apparent from the following description taken in conjunction with the accompanying drawings in which.

DESCRIPTION OF THE PREFERRED EMBODIMENT

Figure 1:
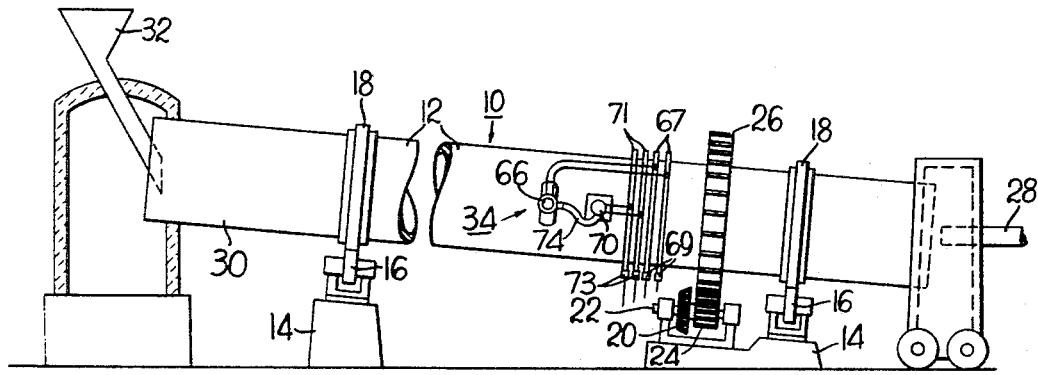
FIG. 1 is a view in side elevation showing a rotary kiln provided with the angularly adjustable pyrometer mount of the invention.
Figure 2:
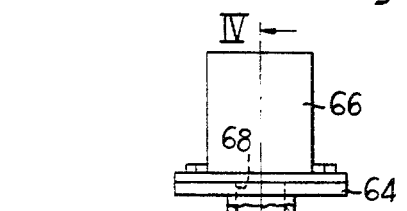
FIG. 2 is a top plan view of the angularly adjustable pyrometer mount of the invention.
Figure 4:
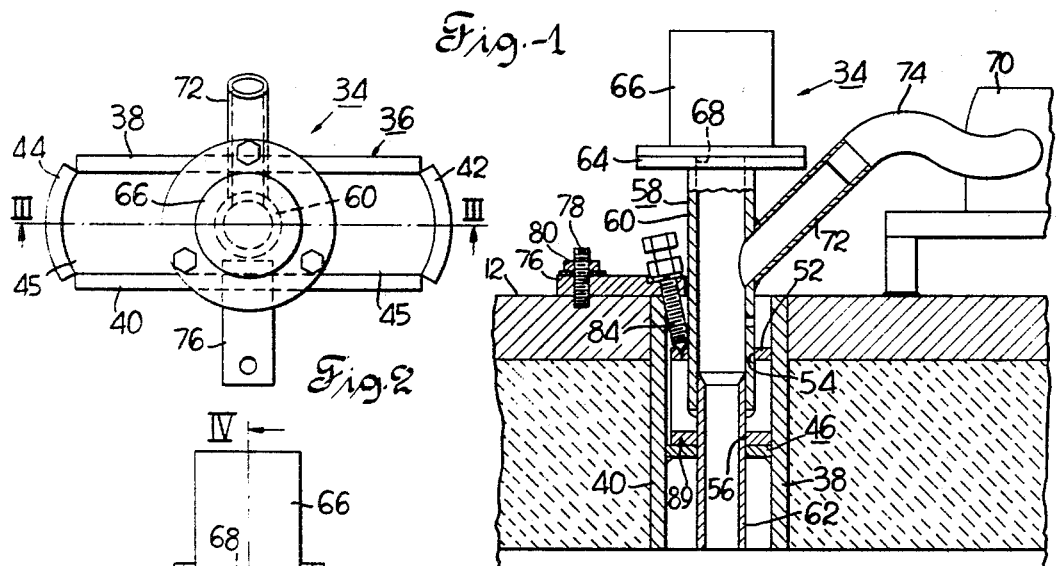
FIG. 4 is a view in section along line IV—IV of FIG. 3.
Figure 3:
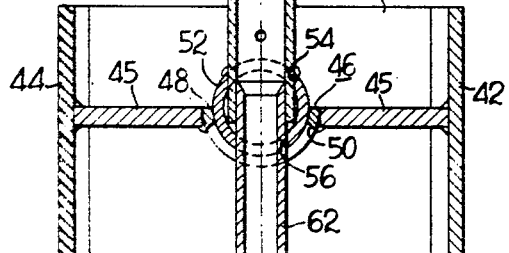
FIG. 3 is a view in section along line III—III of FIG. 2.

Referring now to the drawings, and more particularly to FIG. 1, there is shown a rotary kiln generally indicated at 10 comprising a cylindrical kiln shell 12. The kiln 10 is supported for rotation on a foundation 14 which is so constructed as to impart a slight downward inclination to the kiln from the feed end to the discharge end of the kiln. The inclination may be of the order of one-quarter inch to five-eighths inch per foot, for example, but may be any desired suitable amount. Rollers 16 mounted on the foundation 14 cooperatively engage riding rings 18 mounted on the kiln shell 12 in any well-known manner for rotation of the shell about the longitudinal axis of the kiln. Appropriate driving means, not shown, may actuate a bevel gear 20 fixed to a shaft 22 which carries a pinion 24 in intermeshing coaction with a ring gear 26 carried by the kiln shell 12 for revolving the kiln. The lower end of the kiln is associated with a firing system 28 which may be either of coal, oil, gas burning or other suitable type for furnishing hot gases. The upper end (the feed end) of the kiln proper is formed to receive a preheater unit 30. The material to be heated in the kiln is supplied to the feed end of the kiln by means of a chute or hopper 32.

The angularly adjustable or tiltable pyrometer and sight tube mounting is generally indicated at 34 and includes a boxlike housing member generally indicated at 36 which is inserted in a suitable cutout extending through the outer shell and through the wall of kiln 10. The boxlike housing 36 includes a pair of oppositely disposed spaced wall members 38 and 40 which extend in a direction circumferentially of the kiln shell. The opposite ends of the respective walls 38 and 40 are connected by segmental arcuate shaped plate members 42 and 44, respectively. A pair of bearing support plates 45 extend between the walls 38, 40 and 42, 44. An upwardly open bearing member 46 of semicylindrical shape is received in a centrally located recess between the bearing support plates 45, the upper or radially outer edge 48 of bearing 46 being flush with the contiguous outer surfaces of plates 45. The bearing 46 spans the entire distance between the two oppositely disposed walls 38 and 40. The lower surface of the bearing 46 is provided with an opening or passage 50 therethrough, the opening 50 being substantially centrally located with respect to the transverse dimension of the bearing which extends in the direction between the two side walls 38 and 40 of the supporting box-like housing 36. An angularly movable support 52 in the form of a hollow pipelike member of hollow cylindrical shape is mounted for angular or swivelling movement in bearing 46. The diametrically inner and outer surface portions of the angularly adjustable support 52 are provided with passages 54 and 56 therethrough to receive the sight tube and pyrometer mounting assembly generally indicated at 58. The pyrometer mounting assembly 58 comprises a first hollow pipelike member 60 which extends through the opening 54 in rotatable inner support 52 and a second pipelike member 62 having an outer diameter which is just slightly smaller than the inner diameter of the outer pipe 60. The outer end of the inner pipe 62 projects for a short distance into the inner end of the outer pipe 60 and is welded to outer pipe 60. The pipes 60, 62 are rigidly fixed, as by welding, to the angularly adjustable support 52. At the radially outer end of the outer pipe 60 there is rigidly attached a mounting flange or platform 64 for the radiation pyrometer 66. As is well known, a radiation pyrometer is a temperature sensitive instrument which measures the temperature of an object or material at a distance without making physical contact with the object or material. The electrical output from pyrometer 66 is connected to slip rings 67, from whence it is conducted through brushes 69 to the external control and/or recording circuit. The mounting flange 64 is provided with a central opening 68 therethrough which permits passage of radiant energy to the pyrometer from the interior of the kiln 10 through the hollow pipelike members 60 and 62. A motor driven blower 70 is suitably mounted on the exterior of the kiln. The electrical power input to the blower motor is received through slip rings 71 which are connected to an external electrical power supply through brushes 73. The output air from the blower 70 is connected through a conduit 74 to an inlet connection pipe 72 which is flexibly attached to the sight tube pipe 60 whereby air at a suitable pressure is introduced into the interior of the connected hollow tubular members 60 and 62 to maintain the members 60 and 62 clear of the feed material in the kiln. The air introduced through the inlet pipe 72 from the blower 70 may also have some cooling effect on the pyrometer 66.

It can be seen that the mounting arrangement just described permits the tiltable pyrometer support assembly 58 including the hollow pipelike members 60 and 62, with the pyrometer mounted on flange 64, to be angularly adjusted through a predetermined angle in a plane substantially transverse to the longitudinal axis of the kiln by merely rotating the pyrometer mounting assembly 58 to cause the angularly adjustable support 52 on which the tubes 60 and 62 are mounted to rotate through a predetermined angle relative to the semicylindrical upwardly open bearing member 46. The passage 50 provided through the lower surface of the bearing 46 permits the inwardly projecting sight tube portion 62 to move angularly to the maximum extent permitted by the circumferential dimension of the slot 50. In the illustrated embodiment, the sight tube and pyrometer assembly 58 may be rotated through an angle of approximately 80 degrees. Another factor which may limit the degree of angular rotation is the abutment of the tube 60 against the end walls 42 and 44 during the angular movement of tube 60.

Figure 5:
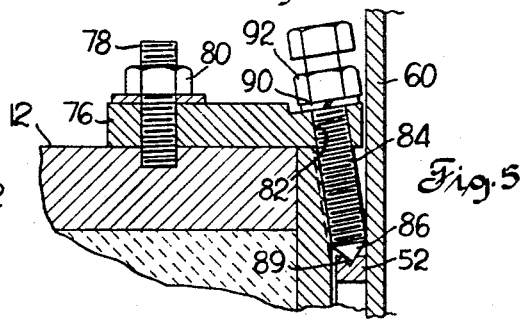
FIG. 5 is a detail view showing the means for locking the angularly adjustable pyrometer mount in a given adjusted position.

In accordance with a further feature of the construction as best seen in FIG. 5, a means is provided to hold the assembly 58 in any given adjusted position as will now be described: A bar member 76 is secured to the outer surface 12 of kiln 10 by means of a stud member 78 having a threaded radially inner end which is received in a screw threaded passage in the outer shell 12 of the kiln. Stud 78 passes through an unthreaded passage in bar 76, the bar 76 being held in place by a nut member 80 which is received on the radially outer threaded end of stud 78. Bar 76 is provided with an inclined bore or passage 82 therethrough which is internally threaded and which receives a threaded screw member 84 having a tipped radially inner end 86. Angularly adjustable support 52 for sight tube and pyrometer assembly 58 is provided with a circumferential groove 89 on the outer surface thereof. To hold the sight tube and pyrometer mounting assembly 58 in any desired adjusted position, the screw 84 is tightened inwardly to cause the pointed end 86 thereof to engage the circumferential groove 89 in pipelike support member 52. With the lock washer 90 and the nut 92 positioned on screw 84, nut 92 is tightened to hold the tipped end 88 of screw 84 tightly in engagement with the groove 89 of the angularly adjustable support member 52.

Figure 6:
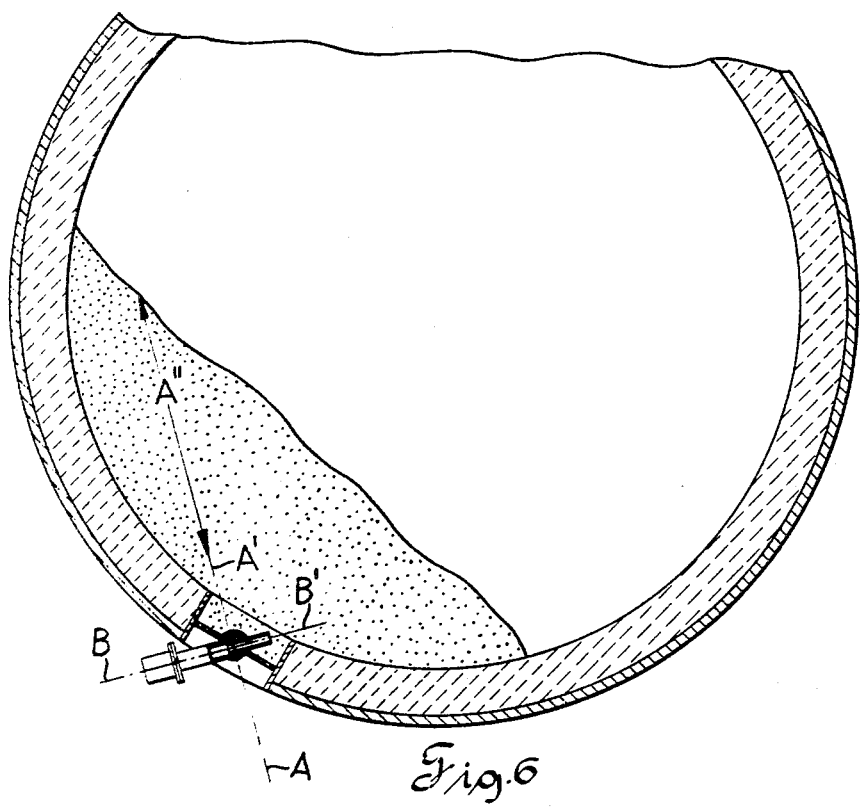
FIG. 6 is a diagrammatic view showing several possible angular positions of the adjustable pyrometer mount on a large kiln with a heavy feed bed.
Figure 7:
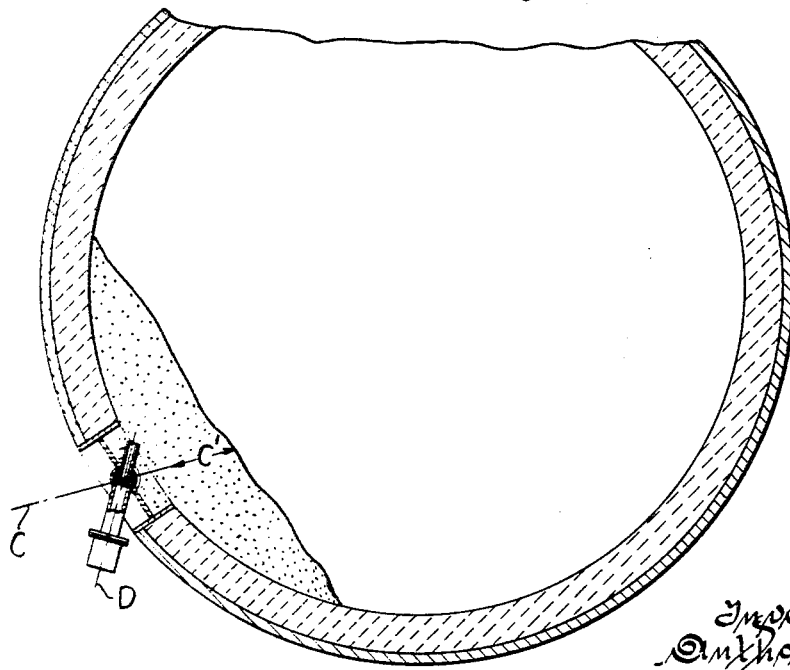
FIG. 7 is a diagrammatic view showing several possible angular positions of the adjustable pyrometer mount in a small kiln with a light feed bed.

The advantages of the tiltable or angularly adjustable pyrometer mounting can best be seen from the diagrammatic illustrations of FIGS. 6 and 7 which respectively represent a heavy feed bed in a large kiln and a light feed bed in a small kiln. Considering first FIG. 6 which illustrates the heavy feed bed in the large kiln, there is shown at A what may be considered to be the worst possible poition of the sight tube and pyrometer mounting for the heavy bed condition. It will be seen that in the A position of the pyrometer a large head of material represented by the dimension A" is bearing down against the entrance A' to the sight tube, thereby tending to cause the material to enter the sight tube wih consequent coating of the pyrometer lens, and obstruction of the field of vision. On the other hand, when the sight tube is at the position illustrated at B, the lens is not pointed at the large head of material, but instead is pointed in a direction generally perpendicular to that of the sight tube in position A, with the result that the material above the sight tube in position B tends to clear or clean the opening to the sight tube at B' and eliminates the various undesirable problems associated with having the sight tube in position A. In accordance with the present invention, the sight tube can be adjusted to the position indicated at B if the load conditions are such as to require such positioning of the sight tube and pyrometer mounting.

Referring now to FIG. 7 which diagrammatically shows the conditions with a light feed bed in a small kiln, the position C of the sight tube in which the sight tube is substantially horizontal, represents the worst sight tube position for this kiln and load condition since there is a tendency of the sight tube in this position for the air which is blown through the sight tube by the air blower associated with the pyrometer assembly, to blow a hole or holes through the relatively light feed bed. This is undesirable since if holes are blown in the feed bed as just described, the pyrometer will sense the temperature on the oppositely disposed kiln wall rather than the temperature of the material which it should be sensing at the moment when the sight tube is in the position C of FIG. 7.

On the other hand, again referring to FIG. 7, if the sight tube is at the angle shown at D in which it is elevated approximately 60 degrees from the substantially horizontal position of position C, there is sufficient back pressure from the head of material above the opening of the sight tube in position D to prevent the blowing of holes through the feed bed. On the other hand, if the sight tube were elevated to a more perpendicular relation with respect to the view shown in FIG. 7, the head of material above the inlet to the sight tube might be too great, with the result that the material would enter the sight tube and cause the various undesirable results previously described in connection with FIG. 6.

FIGS. 6 and 7 taken together show the advantages of an angularly adjustable sight tube since the sight tube and associated pyrometer mounting can be adjusted at the most desirable angle for a given load and kiln condition. For example, at one extreme, as in the case of heavy loads in large kilns, the angle of the sight tube can be adjusted to a position in which the head of material above the entrance to the sight tube is not so great as to cause entrance of the feed bed material into the sight tube with the undesirable results hereinbefore described. On the other hand, where the sight tube is operating at light feed beds in a small kiln, the sight tube can be adjusted to a position in which the air being blown through the sight tube does not cause the blowing of holes through the feed bed with resulting improper temperature readings.

It is believed from the foregoing description that the operation of the subject device should be obvious since the sight tube and the associated pyrometer mounted thereon are swivelly moved by swinging the assembly 58 to cause movement of the cylindrical support 52 relative to the semicylindrical bearing 46. The screw 84 permits the assembly 58 to be tightened at any given adjusted position.

With the pyrometer assembly including the sight tube fixed in the best adjusted position, it rotates with the kiln, and the electrical output from the pyrometer is a continuous analog signal which is fed to suitable control and/or recording equipment.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

The embodiments of the invention in which an exclusive property or previlege is claimed are defined as follows:

1. In combination, a rotary kiln, said kiln having a passage therethrough from the exterior to the interior thereof, a sight tube mounted on said kiln in communication with said passage, a radiation pyrometer carried by and movable with said sight tube, said sight tube communicating at a radially inner end thereof with the interior of said kiln and at a radially outer end thereof with said pyrometer, an air projecting means, means connecting the output of said air projecting means to the interior of said sight tube whereby to cause air to pass through said sight tube to the interior of said kiln, and means mounting said pyrometer and said sight tube for angular adjustment relative to said kiln.

2. The combination defined in claim 1 in which said pyrometer and said sight tube are angularly adjustable in a plane which lies substantially transverse of the longitudinal axis of the rotating kiln.

3. The combination defined in claim 1 including means to secure said pyrometer and said sight tube in a given adjusted position.

4. The combination defined in claim 1 in which said pyromtter is mounted on the radially outer end of said sight tube.

5. The combination defined in claim 1 including a bearing support means mounted in said passage, bearing means mounted on said bearing support means, and means mounting said pyrometer and said sight tube on said bearing means for angular adjustment relative to said kiln.

6. The combination defined in claim 5 in which said pyrometer and said sight tube are angularly adjustable in a plane which lies substantially tranverse of the longitudinal axis of the rotating kiln.

7. The combination defined in claim 5 in which said bearing means contains a recess therein, the radially inner portion of said sight tube extending through said recess, said recess being of sufficient size to permit angular adjusting movement of said sight tube therein.

8. The combination defined in claim 1 in which said sight tube extends into said passage.

9. A pyrometer and air supply assembly adapted for use on a rotary kiln or the like comprising a sight tube, a radiation pyrometer carried by and movable with said sight tube, said sight tube being adapted to communicate with a passage which extends from the exterior to the interior of the kiln, said sight tube being adapted to have a radially inner end thereof communicate with the interior of the kiln and to have a radially outer end thereof communicate with said pyrometer, an air projecting means, means connecting the output of said air projecting means to the interior of said sight tube whereby to cause air to pass through said sight tube to the interior of the kiln, a support means adapted to be mounted on the kiln adjacent said passage, and means for mounting said pyrometer and said sight tube on said support means for angular adjustment relative thereto.

10. A pyrometer and air supply assembly as defined in claim 9 wherein said support means is adapted to be mounted in the passage.

References Cited
UNITED STATES PATENTS

| | | | |
|---|---|---|---|
| 2,815,276 | 12/1957 | Michaux | 73—355 |
| 3,345,873 | 10/1967 | Lellep | 73—351 |
| 3,379,062 | 4/1968 | Lellep | 73—351 |

LOUIS R. PRINCE, Primary Examiner

U.S. Cl. X.R.

73—355